United States Patent
Bräuer et al.

(12) 
(10) Patent No.: US 6,294,637 B1
(45) Date of Patent: Sep. 25, 2001

(54) CONTINUOUS PREPARATION OF MELT-PROCESSABLE POLYURETHANE IN A TWIN SCREW EXTRUDER

(75) Inventors: Wolfgang Bräuer, Leverkusen; Friedemann Müller, Neuss; Jürgen Winkler, Langenfeld; Herbert Heidingsfeld, Frechen, all of (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 09/141,132

(22) Filed: Aug. 27, 1998

(30) Foreign Application Priority Data

Sep. 3, 1997 (DE) .............................. 197 38 498

(51) Int. Cl.⁷ .................. C08G 18/10; C08G 18/32; C08G 18/38
(52) U.S. Cl. ................ 528/61; 528/65; 528/76; 528/77; 528/85
(58) Field of Search .................. 528/44, 61, 65, 528/76, 77, 85

(56) References Cited

U.S. PATENT DOCUMENTS 3,642,964    2/1972    Rausch et al. .
5,795,948    8/1998    Heidingsfeld et al. ............. 528/59
5,905,133 *  5/1999    Muller et al. ..................... 528/61

FOREIGN PATENT DOCUMENTS 29 01 774    7/1980   (DE) .
571 828     12/1993   (EP) .
598 283      5/1995   (EP) .

OTHER PUBLICATIONS

Orbit Derwent English Abstract of DE 29 01 774 (AN: 1980–53590C) (Jul. 24, 1980).
European Search Report issued on a foreign counterpart application No. EP 98 11 5772 (Dec. 18, 1998).
Derwent Abstract of EP 598 283 (May 25, 1995).
Derwent Abstract of EP 571 828 (Dec. 1, 1993).

* cited by examiner

Primary Examiner—Nathan M. Nutter
(74) Attorney, Agent, or Firm—Connolly Bove Lodge & Hutz LLP

(57) ABSTRACT

The invention relates to a process for the continuous preparation of melt-processable polyurethanes, wherein an isocyanate-terminated prepolymer is intensively mixed with chain extender at temperatures of <200° C., and the mixture obtained is converted to melt processable polyurethane in a twin screw extruder under quasi-adiabatic reaction conditions.

20 Claims, No Drawings

CONTINUOUS PREPARATION OF MELT-PROCESSABLE POLYURETHANE IN A TWIN SCREW EXTRUDER

BACKGROUND OF THE INVENTION

1. Field of the Invention

The invention relates to a multi-stage process for the continuous preparation of melt-processable polyurethanes with improved processing characteristics in a twin screw extruder with special temperature control.

2. Description of the Prior Art

Thermoplastic polyurethane elastomers (TPU) are by no means new. They are of industrial importance due to the combination of high-quality mechanical properties with the well known advantages of low-cost melt processability. A wide variety of mechanical properties may be obtained by using different chemical structural components. A review of TPU, their properties and applications is given, e.g., in Kunststoffe 68 (1978) 819 or Kautschuk, Guinmi, Kunststoffe 35 (1982), 568.

TPU are composed of linear polyols, mostly polyester- or polyether-polyols, organic diisocyanates and short-chain diols (chain extenders). In addition, catalysts may be added to accelerate the formation reaction. The structural components may be varied in relatively wide molar ratios in order to adjust the properties. Molar ratios of polyols to chain extenders of 1:1 to 1:12 have proved suitable. Products in the region of 70 Shore A to 75 Shore D are thereby obtained.

The TPU may be prepared continuously or batchwise. Industrial preparation in extruders is by no means new (DE-OS 1 964 834). The structural components are metered individually or in the premixed state into the extruder and the reaction is carried out in the extruder at temperatures between 90 and 220° C. which are preset by way of the extruder barrel. A disadvantage of this process is that the homogeneity and mould release behaviour of the TPU prepared in this way are not sufficient for all fields of application.

According to DE-OS 2 059 570, all the reaction components are fed simultaneously to an intensively mixing and kneading twin screw extruder. The machine is subdivided into a feed zone, a mixing and reaction zone, and a discharge zone. As a result of a barrel temperature profile which rises in a linear manner from the feed zone (30–127° C.) to the discharge zone (177–249° C.), the uniform viscosity required is obtained throughout the zones. The relatively low temperatures of 130 to 170° C. in the reaction zone lead partly to rigid segment deposits. In view of the high final temperature in the discharge zone, the viscosity obtained is not sufficient for thorough mixing, despite the mixing elements, so that nodule-free product cannot be obtained. Moreover, products which are difficult to demould are obtained at these high final temperatures.

A slight improvement in the TPU homogeneity is obtained by a process described in DE-OS 2 610 980. In this case, the starting products are preheated to 180 to 250° C. The barrel temperatures of the extruder are adjusted to a temperature profile which falls from the feed zone (180 to 250° C.) to the discharge (165 to 200° C.). In this way, solid deposits in the reaction part of the extruder are avoided. At the end of the screw, the product is prevented from becoming overheated by the reduced temperature and is extruded more easily at higher viscosities. A disadvantage of this process, however, is the greater dependence on the reactivity of the raw materials. With the usual variations in reactivity of the industrially available monomers, the TPU formation reaction starts so quickly at these high initial temperatures that even intensive monomer mixing cannot guarantee that a homogeneous mixture of reactants is present before the reaction starts. The inadequate mixing then leads to inhomogeneous products.

In order to improve the TPU homogeneity, the use of special conveying and mixing/kneading elements in the reaction extruder was also proposed in DE-OS 23 02 564. According to EP-A 708 124, these are distributed over four different zones in the extruder. The temperature and reaction control and catalyst metering must, however, be adjusted precisely to the screw geometry as a function of the raw material reactivity so that the critical reaction phase occurs exactly at the place where the kneading elements of the extruder are situated. The preparation of different product types is also difficult with a single screw geometry.

EP-A 571 830 describes how, in a simple batch process, by reacting polyol with a partial quantity of the diisocyanate, mixing in the remaining diisocyanate and subsequent chain extension, a TPU is obtained with a markedly higher recrystallisation temperature compared with the standard process, which permits more rapid mould release. The products thus obtained, however, result in films containing specks due to the production process, and are therefore unsuitable for processing by extrusion.

It has now been found that, by means of a new production process with a single screw geometry, various TPU products may be prepared with improved mould release characteristics and a high degree of homogeneity, particularly for the extrusion sector.

SUMMARY OF THE INVENTION

The invention relates to a process for the continuous preparation of melt processable polyurethanes in which an isocyanate-terminated prepolymer is intensively mixed with a chain extender at temperatures of <200° C., preferably within a maximum of 5 seconds, and the mixture obtained is converted to melt processable polyurethane in a twin screw extruder, the screw shafts of which preferably rotate in the same direction, under quasi-adiabatic reaction conditions.

DESCRIPTION OF THE PREFERRED EMBODIMENTS

The conversion of the reaction mixture to melt processable polyurethane takes place in the twin screw extruder under quasi-adiabatic reaction conditions, i.e. in contrast to conventional practice, the temperature is not preset externally by heating or cooling the extruder barrel. The temperature of the reaction mixture is therefore influenced only by the input of mechanical energy by the shafts of the extruder and the heat radiation from the barrel, apart from the heat of reaction.

The isocyanate-terminated prepolymer is prepared preferably by mixing linear hydroxyl-terminated polyols a) with an average molecular weight $\overline{M}_n$, of 500 to 5000 with organic diisocyanate b) continuously in a mixer with high shear energy, converting this mixture continuously in a reactor at temperatures of >120° C. to an isocyanate-terminated prepolymer up to a conversion of >90% based on component a), optionally mixing the prepolymer with further diisocyanate b) and cooling this mixture to a temperature of <200° C.

Linear hydroxyl-terminated polyols with an average molecular weight $\overline{M}_n$, of 500 to 5000 are used as component a). For production reasons, these often contain small amounts of non-linear compounds. Consequently, the term "substantially linear polyols" is often used. Preferably, polyester-, polyether-, polycarbonate-diols or mixtures thereof are used.

Suitable polyether diols may be prepared by reacting one or more alkylene oxides with 2 to 4 carbon atoms in the alkylene radical with a starter molecule containing two active hydrogen atoms in the bound state. Examples of alkylene oxides include: ethylene oxide, 1,2-propylene oxide, epichlorohydrin and 1,2-butylene oxide and 2,3-butylene oxide. Preferably, ethylene oxide, propylene oxide and mixtures of 1,2-propylene oxide and ethylene oxide are used. The alkylene oxides may be used on their own, in alternating succession, or as mixtures. Examples of suitable starter molecules are: water, amino alcohols such as N-alkyldiethanolamines, for example, N-methyldiethanolamine and diols such as ethylene (glycol, 1,3-propylene glycol, 1,4-butane diol and 1,6-hexane diol. Optionally, mixtures of starter molecules may also be used. Moreover, suitable polyetherols are the hydroxyl group-containing polymerization products of tetrahydrofuran. Trifunctional polyethers may also be used in proportions of 0 to 30 wt. % based on the bifunctional polyethers, but at most in a quantity such that the product obtained is still melt processable. The substantially linear polyether diols preferably have average molecular weights $\overline{M}_n$ of 500 to 5000. They may be used both on their own and in the form of mixtures.

Suitable polyester diols may be prepared, for example, from dicarboxylic acids with 2 to 12 carbon atoms, preferably 4 to 6 carbon atoms, and polyhydric alcohols. Examples of suitable dicarboxylic acids are: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids may be used on their own or as mixtures, e.g,. in the form of a succinic, glutaric and adipic acid mixture. Optionally, it may be advantageous for the preparation of the polyester diols to use the corresponding dicarboxylic acid derivatives instead of the dicarboxylic acids, such as carboxylic acid diesters with 1 to 4 carbon atoms in the alcohol radical, carboxylic anhydrides or carboxylic acid chlorides. Examples of polyhydric alcohols are glycols with 2 to 10, preferably 2 to 6 carbon atoms, e.g. ethylene glycol, diethylene glycol, 1,4-butane diol, 1,5-pentane diol, 1,6-hexane diol, 1,10-decane diol, 2,2-dimethyl-1,3-propane diol, 1,3-propane diol or dipropylene glycol. Depending on the properties required, the polyhydric alcohols may be used on their own or in mixtures. Esters of carbonic acid with the diols mentioned, particularly those with 4 to 6 carbon atoms, are also suitable, such as 1,4-butane diol or 1,6-hexane diol, condensation products of ω-hydroxycarboxylic acids such as ω-hydroxycaproic acid or polymerisation products of lactones, e.g. optionally substituted ω-caprolactones. Polyester diols used in preference are ethane diol polyadipates, 1,4-butane diol polyadipates, ethane diol-1,4-butane diol polyadipates, 1,6-hexane diol-neopentylglycol polyadipates, 1,6-hexane diol-1,4-butane diol polyadipates and polycaprolactones. The polyester diols have average molecular weights $\overline{M}_n$ of 500 to 5000 and may be used on their own or in the form of mixtures.

Examples of suitable organic diisocyanates b) are aliphatic, cycloaliphatic, araliphatic, heterocyclic and aromatic diisocyanates, of the kind described e.g. in Justus Liebigs Annalen der Chemie, 562, pages 75 to 136.

More specifically, the following may be mentioned by way of example: aliphatic diisocyanates such as hexamethylene diisocyanate, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate and the corresponding isomer mixtures, 4,4-dicyclohexylmethane diisocyanate, 2,4-dicyclohexylmethane diisocyanate and 2,2-dicyclohexylmethane diisocyanate and the corresponding isomer mixtures, also aromatic diisocyanates such as 2,4-toluene diisocyanate, mixtures of 2,4-toluene diisocyanate and 2,6-toluene diisocyanate, 4,4-diphenylmethane diisocyanate, 2,4-diphenylmethane diisocyanate and 2,2-diphenylmethane diisocyanate, mixtures of 2,4-diphenylmethane diisocyanate, and 4,4-diphenylmethane diisocyanate, urethane-modified liquid 4,4-diphenylmethane diisocyanates or 2,4-diphenylmethane diisocyanates, 4,4-diisocyanato-diphenylethane-(1,2) and 1,5-naphthylene diisocyanate. Products used in preference are 1,6-hexamethylene diisocyanate, 1,4-cyclohexane diisocyanate, isophorone diisocyanate, dicyclohexylmethane diisocyanate, diphenylmethane diisocyanate isomer mixtures with a 4,4-diphenylmethane diisocyanate content of more than 96 wt. %, and in particular 4,4-diphenylmethane diisocyanate and 1,5-naphthenylene diisocyanate. The diisocyanates mentioned may be used individually or in the form of mixtures. They may also be used together with up to 15 mole % (based on total diisocyanate) of a polyisocyanate, but polyisocyanate may be added at most in a quantity that results in a product that is still melt processable. Examples of polyisocyanates are triphenylmethane-4,4 4"-triisocyanate and polyphenylpolymethylene polyisocyanates.

Chain extenders used are diols or diamines with a molecular weight of 60 to 400, preferably aliphatic diols with 2 to 14 carbon atoms, such as, e.g,. ethane diol, 1,6-hexane diol, diethylene, glycol, dipropylene, glycol and particularly 1,4-butane diol. Diesters of terephthalic acid with glycols with 2 to 4 carbon atoms are, however, also suitable, e.g. terephthalic acid-bis-ethylene glycol or terephthalic acid-bis-1,4-butane diol, hydroxyalkylene ethers of hydroquinone, e.g. 1,4-di-(β-hydroxyethyl)-hydroquinone, ethoxylated bisphenols, e.g. 1,4-di(β-hydroxy-ethyl)-bisphenol A, (cyclo)aliphatic diamines, such as isophorone diamine, ethylene diamine, 1,2-propylene diamine, 1,3-propylene diamine, N-methyl-propylene-1,3-diamine, N,N-dimethylethylene diamine and aromatic diamines, such as 2,4-toluene diamine, 2,6-toluene diamine, 3,5-diethyl-2,4-toluene diamine or 3,5-diethyl-2,6-toluene diamine or primary mono-, di-, tri- or tetraalkyl-substituted 4,4-diaminodiphenylmethanes. Chain extenders used in preference are ethane diol, 1,4-butane diol, 1,6-hexane diol, 1,4-di(β-hydroxyethyl)-hydroquinone or 1,4-di(β-hydroxyethyl)-bisphenol A. Mixtures of the abovementioned chain extenders may also be used. Relatively small quantities of triols may also be added.

Moreover, conventional monofunctional compounds may also be added in small quantities, e.g. as chain terminators or mould release aids. Alcohols such as octanol and stearyl alcohol or amines such as butylamine and stearylamine may be mentioned by way of example.

For the preparation of TPU, the structural components, optionally in the presence of catalysts, auxiliaries and/or additives may be reacted in quantities such that the equivalence ratio of NCO groups to the sum of NCO-reactive groups, particularly the OH groups of low molecular weight diols/triols and polyols, is 0.9:1.0 to 1.1:1.0, preferably 0.95:1.0 to 1.10:1.0.

Suitable catalysts according to the invention are the conventional tertiary amines well known according to the state of the art such as, e.g. triethylamine, dimetlhylcyclohexylamine, N-methylmorpholine, N,N-dimethylpiperazine, 2-(dimethyl-amino-ethoxy)-ethanol, diazabicyclo[2,2,2]octane and the like and particularly organic metal compounds such as titanic acid esters, iron compounds or tin compounds such as tin diacetate, tin dioctoate, tin dilaurate or the tin dialkyl salts of aliphatic carboxylic acids such as dibutyltin diacetate or dibutyltin dilaurate or the like. Preferred catalysts are organic metal compounds, particularly titanic acid esters, iron and tin compounds.

In addition to the TPU components and the catalysts, auxiliaries and/or additives may also be added. Examples include lubricants such as fatty acid esters, metal soaps thereof, fatty acid amides, fatty acid ester amides and silicone compounds, antiblocking agents, inhibitors, hydrolysis, light, heat and discoloration stabilisers, flame retardants, dyes, pigments, inorganic and/or organic fillers and reinforcing agents. Reinforcing agents are, in particular, fibrous reinforcing materials such as, e.g. inorganic fibres which are produced according to the state of the art and may also be sized. Further details about the auxiliaries and additives mentioned may be obtained from the specialist literature, for example, the monograph by J. H. Saunders and K. C. Frisch "High Polymers", Volume XVI, Polyurethane, Part 1 and 2, Verlag Interscience Publishers 1962 and 1964, the Taschenbuch für Kunststoff-Additive by R. Gächter and H. Müller (Hianser Verlag Munich 1990) or DE-A 29 01 774.

Further additives that may be incorporated in the TPU are thermoplastics, for example, polycarbonates and acrylonitrile/butadiene/styrene-terpolymers, particularly ABS. Other elastomers such as rubber, ethylene/vinyl acetate copolymners, styrene/butadiene copolymers and other TPU may also be used. Moreover, commercial plasticisers such as phosphates, phthalates, adipates, sebacates and alkylsulphonic acid esters are suitable for incorporation.

In a preferred embodiment of the invention, the reaction components are mixed continuously in a mixer with high shear energy for prepolymer formation. This may be, for example, a mixing head, preferably a high-speed porcupine mixer, or a nozzle. The quantities according to the invention are preferably chosen in such a way that the NCO/OH ratio of the quantity or partial quantity of diisocyanate b) and polyol a) is 1.5:1 to 5.0:1, preferably 2.05:1 to 3.0:1.

Prepolymer preparation takes place preferably continuously in a reactor, for example, a tube. A tube with static mixers or a stirred tube (tubular mixer) with a length/diameter ratio of more than 4:1 are used in particular preference. In a particularly preferred form, a combination of nozzle and tube with static mixers, or a tubular mixer is used for prepolymer preparation.

According to the invention, conversion should be as complete as possible dulling the preparation of the prepolymer, i.e. more than 90 mole % of the polyol should be converted in the prepolymer. The reaction temperatures are preferably above 120° C., particularly preferably between 140 and 220° C.

Prior to the reaction with chain extender, further diisocyanate b) may optionally be added rapidly and continuously to the prepolymer. One or more static mixers in a tube may be used in preference for this purpose. A nozzle, a mixing head, or the mixing elements of an extruder may also be used.

In a preferred embodiment of the invention, the prepolymer mixture is cooled to a temperature of <200° C., preferably <175° C. An optionally cooled tube or the cooled part of an extruder provided with conveying elements are suitable for this purpose. Cooling in an externally cooled twin screw extruder is particularly preferred. This prevents inhomogeneities occurring during the ensuing reaction due to insufficient component mixing.

According to the invention, the prepolymer is mixed intensively with chain extender, preferably within a maximum of 5 seconds. A mixer operating with high shear energy is also preferred for this purpose, e.g. a mixing head, a nozzle or a high-speed screw extruder with a small mixing volume. The intensive mixing is carried out particularly preferably by the mixing elements of a twin screw extruder with both screw shafts rotating in the same direction. In a preferred variant of the process, the corresponding barrel is neither heated nor cooled; in a further preferred variant, the barrel is cooled.

The mixture obtained is converted to melt processable polyurethane in a twin screw extruder, the screw shafts of which preferably rotate in the same direction, under quasi-adiabatic reaction conditions. The barrels of the extruder are neither heated nor cooled with any particular medium. Only heat radiation to the surroundings takes place. This type of temperature control may be called "quasi-adiabatic". In this case, the TPU is heated by its own heat of reaction to the extent that a homogeneous reaction is always guaranteed but the temperatures reached are not so high as to harm the product. The mass temperatures follow a profile which first rises and then falls slightly with a maximum at 210 to 240° C.

The temperature profile obtained in the twin screw extruder when carrying out the process according to the invention may be measured and used as a control variable for adjusting the product properties since the temperatures obtained in the extruder correlate with the reactivity of the raw materials. If this is too high, it is not possible to guarantee sufficient mixing of the raw materials with the specified apparatus. Consequently, inhomogeneous reaction products are obtained. If the reactivity is too low, TPU preparation in the extruder cannot be carried out with the necessary conversion. A consistently good product quality may be achieved by controlling the reactivity of the mixture fed to the extruder. Tile invention also relates, therefore, to a process in which the temperature profile obtained in the extruder is measured and compared with a prescribed desired temperature profile and discrepancies are corrected by altering the reactivity of the mixture fed to the extruder. The desired temperature profile may have been determined, for example, by means of a trial run in which a product with the desired properties was obtained. The reactivity of the mixture fed to the extruder may be adjusted, e.g. by varying the catalyst metering or the temperature of the mixture fed to the extruder, or the components used for the preparation thereof. The reactivity may thus be increased by increasing the amount of catalyst added or raising the temperature, or decreased by reducing the amount of catalyst added or lowering the temperature.

The TPU prepared according to the process of the invention may be processed to injection moulded articles, films, coating compounds or fibres. In injection moulding applications, the products are characterised by improved demoulding characteristics at a low melting temperature, a fact which allows the injection moulding processor to use a shorter cycle time. Films with good homogeneity, excellent melting characteristics and very good stability of the film bubble can be prepared by extrusion from the TPU prepared according to the invention. In all applications, the thermal stability of the TPU is markedly improved by the process according to the invention.

EXAMPLES

In the Examples that follow, the results of DSC measurements (differential scanning calorimetry) are given as a measure of the improved mould release characteristics described. The crystallisation temperature $T_c$ correlates with the recrystallisation capacity (C. S. Schollenberger, Abstr. Pap. Am. Chem. Soc. 1979, 83; J. Foks et al., Eur. Pol. J. 25, 31).

The DSC measurements were carried out with a calorimeter of the DSC-7 type made by Perkin Elmer. The TPU product was heated in a nitrogen medium at 20° C./min from −70° C. to 260° C., and then cooled at 40° C./min to −70° C. Recrystallisation becomes apparent in the cooling phase from an exothermic signal.

The shear modulus measurements were carried out on injection moulded bars. A device of the RDA type made by Rheometrics was used for the measurement. During the measurement, which was carried out at a frequency of 1 Hz in the temperature rang,e from −125° C. until softening at about 200° C., the temperature was raised in stages of 5 Kelvin. The temperature at which the modulus falls below 1 MPa (loss of dimensional stability) is given as a measure of the thermal stability.

Examples

The following overall formulation was used in the examples:
1.0 mole of polybutane diol-1,4-adipate (molecular weight about 2200)
2.5 mole of 1,4-butane diol
3.5 mole of 4,4-diphenylmethane diisocyanate
0.7 wt. %, based on TPU, of bis-ethylene stearylamide (metering in barrel 1 of the extruder)

Example 1 (process not according to the invention)

The polyol, in which 150 ppm, based on the total quantity of polyol, of tin dioctoate were dissolved as catalyst, was heated to 140° C. and metered continuously into the first barrel of an extruder of the ZSK 83 type (Werner/Pfleiderer). The total quantity of 4,4-diphenylmethane diisocyanate heated to 60° C. was metered into the same barrel. The 1,4-butane diol was conveyed continuously into barrel 5. A temperature profile rising from 150 to 240° C. was preset for the 13 barrels. The screw speed was 300 rpm. The metering speed was adjusted in such a way that the residence time of the reaction components in the ZSK was about 1 minute. At the end of the screw, the hot melt was hauled off as extrudate, cooled in a water bath and granulated.

Example 2 (process not according to the invention)

The polyol, in which 140 ppm, based on the total quantity of polyol, of tin dioctoate were dissolved as catalyst, was heated to 160° C. and metered continuously into a tube with 3 static mixers (Sulzer). At the same time, a partial quantity 1 (=2.45 mole) of 4,4-diphenylmethane diisocyanate heated to 60° C. was pumped into the tube. The residence time in the tube with the static mixers was 30 seconds. 98 Mole % of the resulting prepolymer, based on the polyester, was converted. The partial quantity 2 (=1.05 mole) of 4,4-diphenylmethane diisocyanate was mixed into the prepolymer within 5 seconds by a fourth downstream static mixer (Sulzer). The reaction mixture was metered into barrel 1 of an extruder of the ZSK 83 type and there heated to about 220° C. in the subsequent barrels in a similar way to Example 1. The 1,4-butane diol, which was mixed into the prepolymer by a short, intensively mixing mixing element under barrel 6, was metered into barrel 5. In the final part of the screw, the reaction components were converted to TPU. The temperature of the extruder barrel was adjusted to 240° C. The screw speed was 300 rpm. At the end of the screw, the hot melt was hauled off as extrudate, cooled in the water bath and granulated.

Example 3 (according to the invention)

The prepolymer was prepared in the same way as in Example 2. The prepolymer was then cooled in the first part of the extruder (barrels 1 to 3). The 1,4-butane diol, which was mixed into the prepolymer by a short, intensively mixing mixing, element under barrel 6, was metered into barrel 5. The addition of 1,4-butane diol and the reaction to TPU were carried out under quasi-adiabatic conditions.

Example 4 (according to the invention)

The prepolymer was prepared in the same way as in Example 2. The 1,4-butane diol was metered into barrel 5. The first part of the extruder (barrels 1 to 5) was cooled, after which the reaction to TPU was carried out under quasi-adiabatic conditions.

The temperature profiles preset for the extruder barrels in the Examples are reproduced in Table 1.

Example 5 (not according to the invention)

Formulation: 0.4 mole of polypropylene ether glycol (molecular weight=2000)
0.6 mole of polytetramethylene ether glycol (molecular weight=1000)
1.84 mole of 1,4-butane diol
0.08 mole of 1,6-hexane diol
2.92 mole of 4,4-diphenylmethane diisocyanate
0.7 wt. % (based on TPU) of bis-ethylene stearylamide (metering ZSK barrel 1)

The polymer mixture in which 140 ppm, based on the total quantity of polyol, of tin dioctoate were dissolved as catalyst, was heated to 200° C. and metered continuously into a tubular mixer (speed of stirrer 300 rpm). At the same time, a partial quantity 1 (=2.28 mole) of 4,4-diphenylmethane diisocyanate heated to 60° C. was pumped into the tubular mixer. The residence time in the tubular mixer was 60 sec.

97 Mole % of the resulting prepolymer, based on polyol, was converted. The partial quantity 2 (=0.64 mole) of the 4,4-diphenylmethane diisocyanate was mixed into the prepolymer within 5 sec by a static mixer (Sulzer). The reaction mixture was metered into barrel 1 of an extruder of the ZSK 120 type and there heated in the subsequent barrels to about 180° C. in a similar way to Example 1. The butane diol/hexane diol mixture which was mixed into the prepolymer by a short, intensively mixing mixing, element under barrel 4 was metered into barrel 3. In the final part of the screw, the reaction components were converted to TPU.

The temperature of the extruder barrel was adjusted to 240–250° C. The screw speed was 300 rpm. At the end of the screw, the hot melt was hauled off as extrudate, cooled in the water bath and granulated.

Example 6 (according to the invention)

The formulation and prepolymer preparation were similar to that in Example 5. The prepolymer was then cooled in the first part of the extruder (barrels 1 to 3). The addition of the butane diol/hexane diol mixture again took place in a similar way to Example 5. The reaction to TPU was carried out under quasi-adiabatic conditions.

Preparation of Blown Film

The TPU granules were melted in a single screw extruder of the 30/25D Plasticorder PL 2000-6 type from Brabender (feed 3 kg/h; temperature 185–205° C.) and extruded through a film-blowing die to blown film.

Preparation of Injection Moulded Bodies

The TPU granules were melted in an injection moulding machine of the D60 type (32 screw) made by Mannesmann (mass temperature about 225° C.) and moulded to bars (mould temperature 40° C.; bar size 80×10×4 mm).

The data of the products obtained in the Examples are summarised in Table 2. The Examples according to the invention show a markedly improved thermal stability and a higher recrystallisation temperature compared with the prepolymer process with temperatures preset by the extruder barrel or prepolymer preparation in the static mixer followed by reaction in the extruder with a preset temperature profile. This leads to more rapid curing of injection moulded bodies. In addition, the film homogeneity is improved in view of the optimum reaction conditions.

TABLE 1

Preset extruder barrel temperatures

| Example | Barrel | 2 | 3 | 4 | 5 | 6 | 7 | 8 | 9 | 10 | 11 | 12 | 13 |
|---|---|---|---|---|---|---|---|---|---|---|---|---|---|
| 1* | 150° C. | 180° C. | 200° C. | 220° C. | 220° C. | 240° C. | 240° C. | 240° C. | 240° C. | 240° C. | 220° C. | 180° C. | 150° C. |
| 2 | 150° C. | 180°C | 200° C. | 220° C. | 220° C. | 240° C. | 240° C. | 240° C. | 240° C. | 240° C. | 220° C. | 180° C. | 150° C. |
| 3 | 80° C. | 80° C. | 80° C. | none | none | none | none | none | none | none | none | 150° C. | 110° C. |
| 4 | 80° C. | 80° C. | 80° C. | 80° C. | 80° C. | none | none | none | none | none | none | 150° C. | 110° C. |
| 5* | 180° C. | 180° C. | 180° C. | 180° C. | 230° C. | 240° C. | 240° C. | 250° C. | 250° C. | 240° C. | 240° C. | 110° C. | 110° C. |
| 6 | 80° C. | 80° C. | 80° C. | none | none | none | none | none | none | 110° C. | 110° C. | 110° C. | 110° C. |

*comparison Example not according to the invention

TABLE 2

Product data

| Example | Shore A hardness (DIN 53505) | Injection moulding: Shore A hardness directly after mould release | MFI at 200° C. (DIN 53 735) [ccm/10 min] | Recryst. temp. (DSC) [° C.] | Blown film homogeneity | Thermal stability Shear modulus Temperature at 1 MPa [° C.] |
|---|---|---|---|---|---|---|
| 1* | 85 | 73 | 13 | 104 | satisfactory | 157 |
| 2* | 85 | 71 | 12 | 111 | poor | 155 |
| 3 | 85 | 74 | 12 | 116 | good | 166 |
| 4 | 85 | 73 | 12 | 110 | good | 160 |
| 5* | 85 | — | 30 | 99 | poor | — |
| 6 | 85 | — | 33 | 102 | good | — |

*Comparison Example not according to the invention

What is claimed is:

1. A process for continuously preparing a melt-processable polyurethane, the process comprising the steps of:
   A) intensively mixing an isocyanate-terminated prepolymer with a chain extender at a temperature of less than 200° C. to form a reaction mixture; and
   B) converting the reaction mixture to the melt-processable polyurethane in a twin screw extruder under quasi-adiabatic reaction conditions.

2. The process according to claim 1, wherein intensive mixing of step A) is carried out within 5 seconds.

3. The process according to claim 1, wherein the twin screw extruder comprises screw shafts which rotate in the same direction.

4. The process according to claim 1, wherein prior to step A) the isocyanate-terminated prepolymer is prepared by a process comprising the steps of:
   a) mixing a substantially or fully linear hydroxyl-terminated polyol with an average molecular weight $\overline{M}_n$ of 500 to 5000 with an organic diisocyanate to form a prepolymer reaction mixture;
   b) continuously converting the prepolymer reaction mixture in a reactor at a temperature of >120° C. to the isocyanate-terminated prepolymer with a conversiion ratio of >90 wt. % based on the amount of polyol in step a); and
   c) cooling the isocyanate-terminated prepolymer to a temperature of <200° C.

5. The process according to claim 4, wherein the process of preparing the isocyanate-terminated prepolymer further comprises adding further diisocyanate between steps b) and c).

6. The process according to claim 1, wherein the twin screw extruder comprises barrels which are cooled or not heated.

7. The process according to claim 1, wherein a high shear energy mixer provides the intensive mixing in step A).

8. The process according to claim 7, wherein the twin screw extruder of step B) further operates as the high shear energy mixer of step A).

9. The process according to claim 7, wherein the high shear energy mixer is a mixing head, a nozzle, mixing elements of an extruder, or a combination thereof, optionally operating in a tube.

10. The process according to claim 1, wherein the isocyanate-terminated prepolymer has a temperature of <175° C. before being intensively mixed with the chain extender in step A).

11. The process according to claim 1, wherein the temperature of the reaction mixture in step B) is ≦240° C.

12. The process according to claim 1, further comprising adding one or more compounds which are chain terminators, mold release aids, catalysts, auxiliaries, additives or mixtures thereof, to the reaction mixture.

13. The process according to claim 1, wherein the melt-processable polyurethane has an equivalence ratio of NCO groups to the sum of NCO-reactive groups of 0.9:1.0 to 1.1:1.0.

14. A melt-processable polyurethane prepared by the process according to claim 1.

15. An injection moulded article, extrudable film, fiber, or coating compound prepared from the melt-processable polyurethane of claim 14.

16. The melt-processable polyruethane of claim 14, having a shear modulus temperature at 1 Mpa of at least 160° C.

17. A process for continuously preparing a melt-processable polyurethane, the process comprising the steps of:
   A) intensively mixing an isocyanate-terminated prepolymer with a chain extender at a temperature of less than 200° C. to form a reaction mixture; and
   B) converting the reaction mixture to the melt-processable polyurethane in a twin screw extruder under quasi-adiabatic conditions;
   wherein the process further comprises:
      (i) determining a prescribed temperature profile for the reaction mixture in step B) by performing a trial run beforehand to obtain a product possessing desired properties;
      (ii) measuring an actual temperature profile of the reaction mixture in step B);
      (iii) comparing the actual temperature profile to the prescribed temperature profile; and
      (iv) adjusting reactivity of the reaction mixture in step B) by adjusting the actual temperature profile in step B), based on the comparison of the actual and prescribed temperature profiles, the actual temperature profile being adjusted by performing at least one of the following steps:
         adjusting the temperature and/or an amount of the reactants in step A);
         adjusting a temperature and/or an amount of the reaction mixture in step B); and
         adjusting a temperature and/or an amount of a catalyst which is used in the preparation of the melt-processable polyurethane.

18. The process according to claim 1, wherein the melt processable polyurethane is converted in the twin screw extruder at a maximum temperature range of from 210 to 240° C.

19. The process according to claim 12, wherein the catalysts are tertiary amines, titanic acid esters, iron compounds or tin compounds.

20. The process according to claim 13, wherein the equivalence ratio is 0.95:1.0 to 1.10:1.0.

* * * * *